United States Patent
Davis et al.

(10) Patent No.: US 6,484,673 B1
(45) Date of Patent: Nov. 26, 2002

(54) INTERNAL COMBUSTION ENGINE EMPLOYING COMPRESSED GAS INJECTION AND TRANSPORTATION VEHICLE HAVING SAME ASSEMBLED THEREIN

(75) Inventors: George C. Davis, Ypsilanti, MI (US); Jialin Yang, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/610,725

(22) Filed: Jul. 6, 2000

(51) Int. Cl.[7] .......................... F02B 41/00; F02B 75/00
(52) U.S. Cl. .................... 123/26; 123/432; 123/302
(58) Field of Search ...................... 123/26, 302, 316, 123/432, 525, 527, 90.11, 90.15, 533

(56) References Cited

U.S. PATENT DOCUMENTS

| | | | |
|---|---|---|---|
| 3,266,234 A | * 8/1966 | Cook | 123/26 |
| 3,577,961 A | 5/1971 | Deutschmann | |
| 3,814,065 A | * 6/1974 | Gospodar | 123/26 |
| 4,240,381 A | 12/1980 | Lowther | |
| 4,426,985 A | 1/1984 | Kanesaka | |
| 4,526,139 A | * 7/1985 | Medlinsky | 123/26 |
| 4,809,649 A | 3/1989 | Brinkman | |
| 5,261,356 A | 11/1993 | Takahashi et al. | |
| 5,297,507 A | * 3/1994 | Ma | 123/90.17 |
| 5,718,194 A | 2/1998 | Binion | |
| 5,862,790 A | 1/1999 | Dai et al. | |
| 6,173,567 B1 | * 6/2001 | Poola et al. | 123/26 |
| 6,305,363 B1 | * 10/2001 | Klomp | 123/533 |

* cited by examiner

*Primary Examiner*—Gene Mancene
*Assistant Examiner*—Arnold Castro
(74) *Attorney, Agent, or Firm*—Randy W. Tung; Carlos L. Hanze

(57) ABSTRACT

Within each of: (1) an internal combustion engine system; (2) a transportation vehicle which incorporates the internal combustion engine system; and (3) a method for operating the internal combustion engine system, there is employed: (1) an internal combustion engine having a minimum of one combustion chamber; (2) a gas compressor absent an associated compressed gas tank, where the gas compressor is driven by a power output of the internal combustion engine; and (3) a controller programmed for providing a compressed gas charge from the gas compressor to the minimum of one combustion chamber during a portion of a compression cycle within the minimum of one combustion chamber, but not including a beginning portion of the compression cycle within the minimum of one combustion chamber. Each of the internal combustion engine system, transportation vehicle and method provides enhanced internal combustion engine performance and economy.

21 Claims, 1 Drawing Sheet

INTERNAL COMBUSTION ENGINE EMPLOYING COMPRESSED GAS INJECTION AND TRANSPORTATION VEHICLE HAVING SAME ASSEMBLED THEREIN

BACKGROUND OF THE INVENTION

1. Field of the Invention

The present invention relates generally to design, development and manufacturing of internal combustion engines. More particularly, the present invention relates to design, development and manufacturing of internal combustion engines having enhanced performance.

2. Description of the Related Art

Transportation vehicle manufacturers typically design, develop and manufacture transportation vehicle engines employed for powering transportation vehicles with the intent to provide transportation vehicle engines with enhanced levels of performance and enhanced levels of economy. While enhanced levels of performance and enhanced levels of economy may typically be simultaneously realized with respect to a spark ignition internal combustion transportation vehicle engine by increasing a compression ratio of the spark ignition internal combustion internal combustion transportation engine, increasing a compression ratio of the spark ignition internal combustion transportation vehicle engine is not entirely without problems in the art of transportation vehicle engine design, development and manufacturing.

In that regard, it is also known in the art of spark ignition internal combustion transportation vehicle engine design, development and manufacturing that an increased compression ratio of a spark ignition internal combustion transportation vehicle engine eventually leads to knock in the spark ignition internal combustion transportation vehicle engine when the spark ignition internal combustion transportation vehicle engine is operated at high load. In turn, knock in a spark ignition internal combustion transportation vehicle engine is typically understood as occurring due to excessive heating and premature detonation of an air/fuel mixture charge within a combustion chamber within the spark ignition internal combustion transportation vehicle engine.

It is thus towards the goal of providing internal combustion engines in general, and spark ignition internal combustion engines more particularly, with enhanced performance, enhanced economy and less susceptibility to detrimental effects, such as but not limited to knock, that the present invention is directed.

Various internal combustion engines having desirable properties, and methods of operation thereof, have been disclosed in the art of internal combustion engine design, development and manufacturing.

For example, Lowther, in U.S. Pat. No. 4,240,381, discloses an internal combustion engine system, and a method for operation thereof, which employs selective consumption of an auxiliary air source compressed within a compressed air tank that comprises the internal combustion engine system, to enhance fuel economy of the internal combustion engine system. In addition, Kanesaka, in U.S. Pat. No. 4,426,985, discloses a supercharged internal combustion engine that employs a knock sensor to optimize with respect to knock within the supercharged internal combustion engine a quantity of an air/fuel mixture injected into a combustion cylinder that comprises the supercharged internal combustion engine. Further, Brinkman, in U.S. Pat. No. 4,809,649, discloses a four stroke internal combustion engine that employs a combustion chamber scavenging air flow to attenuate nitrogen oxides emission from the four stroke internal combustion engine. Still further, Binion, in U.S. Pat. No. 5,718,194, discloses a spark ignition internal combustion engine that employs a combustion chamber water injection flow to analogously attenuate nitrogen oxides emission from the spark ignition internal combustion engine. Finally, Dai et al., in U.S. Pat. No. 5,826,790, discloses a method for operating a spark ignition internal combustion engine while employing variable valve timing and enhanced air/fuel mixture turbulence to provide the spark ignition internal combustion engine with enhanced efficiency.

The teachings of each of the foregoing related prior art references are incorporated herein fully by reference.

Desirable in the art of internal combustion engine design, development and manufacturing are additional apparatus and methods that may be employed to provide internal combustion engines with enhanced performance and enhanced economy.

It is towards the foregoing object that the present invention is directed.

SUMMARY OF THE INVENTION

In accord with the object towards which the present invention is directed, there is provided by the present invention: (1) an internal combustion engine system; (2) a transportation vehicle having assembled therein the internal combustion engine system; and (3) a method for operating the internal combustion engine system. In accord with each of the foregoing internal combustion engine system, transportation vehicle and method, there is employed: (1) an internal combustion engine having a minimum of one combustion chamber; (2) a gas compressor absent a compressed gas tank associated therewith, where the gas compressor is driven by a power output of the internal combustion engine; and (3) a control means programmed for providing a compressed gas charge from the gas compressor to the minimum of one combustion chamber during a portion of a compression cycle within the minimum of one combustion chamber, but not including a beginning portion of the compression cycle within the minimum of one combustion chamber.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention provides: (1) an internal combustion engine system; (2) a transportation vehicle having assembled therein the internal combustion engine system; and (3) a method for operating the internal combustion engine system. In accord with each of the foregoing internal combustion engine system, transportation vehicle and method, there is employed: (1) an internal combustion engine having a minimum of one combustion chamber; (2) a gas compressor absent a compressed gas tank associated therewith, where the gas compressor is driven by a power output of the internal combustion engine; and (3) a control means programmed for providing a compressed gas charge from the gas compressor to the minimum of one combustion chamber during a portion of a compression cycle within the minimum of one combustion chamber, but not including a beginning portion of the compression cycle within the minimum of one combustion chamber.

Although the preferred embodiment of the present invention illustrates the present invention within the context of a reciprocating piston internal combustion engine, and further although the present invention provides particular value for attenuating knock within a spark ignition four cycle reciprocating piston internal combustion engine employed most particularly within a transportation vehicle. application, the present invention may be employed to enhance performance of internal combustion engines including but not limited to two cycle internal combustion engines, four cycle internal combustion engines, reciprocating piston internal combustion engines, rotary piston internal combustion engines, spark ignition (or other discharge ignition) internal combustion engines and compression ignition (i.e., diesel or gasoline) internal combustion engines which may be employed within applications including but not limited to transportation vehicle applications and applications other than transportation vehicle applications, where such applications other than transportation vehicle applications may include mobile applications and stationary applications. With respect to transportation vehicle applications, the present invention may be employed with respect to passenger transportation vehicles, sport utility transportation vehicles, light utility transportation vehicles and heavy utility transportation vehicles.

Figure 1:
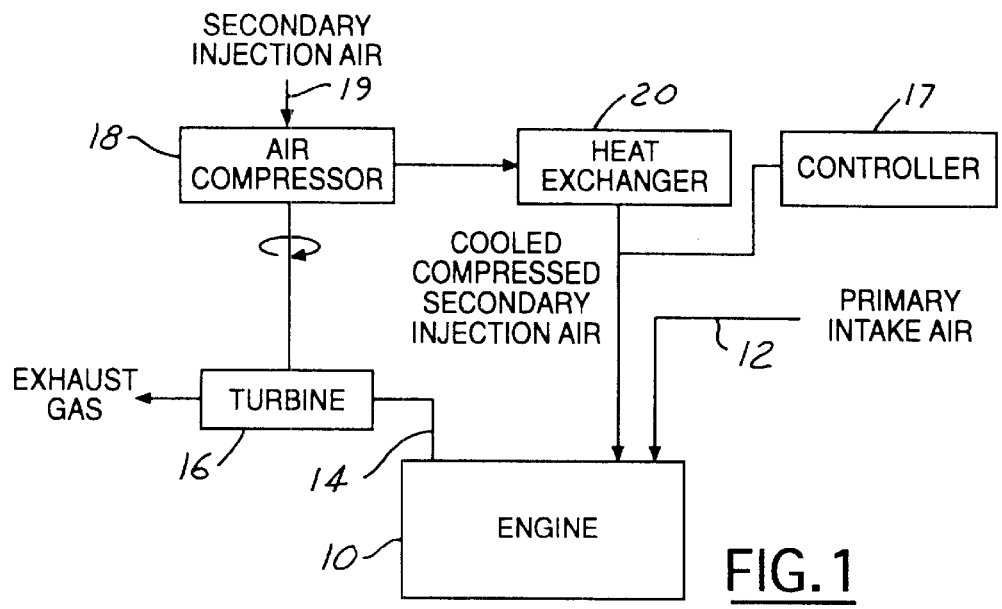
FIG. 1 shows a schematic diagram of an internal combustion engine system in accord with the present invention.

Referring now to FIG. 1, there is shown a schematic diagram of an internal combustion engine system in accord with the preferred embodiment of the resent invention.

Shown in FIG. 1 is an internal combustion engine 10 comprising a minimum of one combustion chamber (not specifically illustrated) to which is supplied a primary intake air flow 12 through a primary intake port (also not specifically illustrated) and from which there is exhausted an exhaust gas flow 14 through an exhaust port (also not specifically illustrated). As is illustrated within the schematic diagram of FIG. 1, the exhaust gas flow 14 exhausted from the minimum of one combustion chamber is employed to drive a turbine 16 that in turn drives an air compressor 18 that in turn compresses a secondary injection air flow 19 to form a compressed secondary injection air flow 19. The compressed secondary injection air flow 19 is then passed through a heat exchanger 20 to form a cooled compressed secondary injection air flow 19 prior to being injected into the minimum of one combustion chamber within the internal combustion engine 10 through a secondary intake port (also not specifically illustrated). Finally, there is shown within the schematic diagram of FIG. 1 a controller 17 that controls the cooled compressed secondary injection air flow 19.

Although the preferred embodiment of the present invention illustrates the present invention within the context of the turbine 16 driven by a thermal exhaust gas flow 14 output of the internal combustion engine 10, where the turbine 16 in turn drives the air compressor 18, as is understood by a person skilled in the art, the present invention requires only that a power output from the internal combustion engine 10 directly or indirectly drive the air compressor 18. Such power output from the internal combustion engine 10 that directly or indirectly drives the air compressor 18 may be selected from the group including but not limited to a thermal power output, a mechanical power output and an electrical power output.

Notable within the present invention, in particular in comparison with the related art as disclosed within the Description of the Related Art, is the absence of a compressed air tank employed in conjunction with and associated with the air compressor 18.

Similarly, although FIG. 1 illustrates the present invention within the context of the air compressor 18, as is similarly also understood by a 10 person skilled in the art, the present invention in general employs a gas compressor which is driven by a power output from the internal combustion engine 10. Typically and preferably, for practical purposes the gas that is compressed by the gas compressor is air, although other gases may also be employed within the present invention. Similarly, the air compressor 18 may also include a discriminating means, such as but not limited to a membrane discriminating means, which may be employed for enriching the compressed secondary injection air flow 19 with respect to a particular component, such as but not limited to oxygen.

Within the preferred embodiment of the present invention with respect to the heat exchanger 20, the heat exchanger 20 is employed to cool the compressed secondary injection air flow 19, typically and preferably to a temperature about 20 to about 25 degrees centigrade above a temperature of an ambient environment which surrounds the engine 10.

Similarly, typically and preferably, the cooled compressed secondary injection air flow 19 when injected into the internal combustion engine 10 is typically and preferably injected at a pressure greater than a pressure at which is supplied or injected the primary intake air flow 12 into the internal combustion engine 10, even under conditions where the primary intake air flow 12 is supplied pre-compressed under pressure of a turbocharger or a supercharger. Thus, typically and preferably the cooled compressed secondary injection air flow 19 is supplied to the internal combustion engine 10 at a pressure of at least about 2 bar, more preferably from about 72 to about 290 bar and most preferably from about 116 to about 232 bar, with some variability of injection pressure dependent upon a geometric compression ratio of the internal combustion engine 10. Similarly typically and preferably, the cooled compressed secondary injection air flow 19 will have a mass flow of from about 30 to about 80 percent, and more typically and preferably from about 40 to about 60 percent, of the mass flow of the primary intake air flow 12 supplied or injected into the combustion chamber within the internal combustion engine 10.

Finally, within the preferred embodiment of the present invention with respect to the controller 17, the controller 17 is programmed to provide a cooled compressed secondary injection air flow 19 charge from the air compressor 18 to the minimum of one combustion chamber within the internal combustion engine 10 during a portion of a compression cycle within the minimum of one combustion chamber, but not including a beginning portion of the compression cycle within the minimum of one combustion chamber. Such result may be realized by controlling with the controller 17 the cooled compressed secondary injection air 19 flow, or alternatively, by controlling a component within the internal combustion engine system whose schematic diagram is illustrated in FIG. 1. The controller 17 may be selected from the group of controllers including but not limited to electronic controllers, electrical controllers, mechanical controllers and electromechanical controllers, although controllers that are at least in part electronic controllers are typically preferred.

Within the context of the present invention when the cooled compressed secondary injection air flow 19 is injected into the combustion chamber within the internal combustion engine 10 when the internal combustion engine 10 is operating at a high load or a full load, a primary intake air flow 12 intake valve closing timing within the internal combustion engine 10 optionally may be either retarded or advanced to reduce and control a primary intake air mass supplied via the primary intake air flow 12. Thus a total intake air mass provided to the internal combustion engine 10 via the primary intake air flow 12 and the cooled compressed secondary injection air flow 19 may be further controlled. Typically and preferably, the total (primary and secondary) intake air mass into the internal combustion engine 10 is from about equal to, and up to about 10 to about 20 percent greater than, a total intake air mass provided via only a primary intake air flow provided with conventional intake valve closing timing.

As is understood by a person skilled in the art, by employing within the present invention and the preferred embodiment of the present invention the cooled compressed secondary injection air flow 19 charge injected into the minimum of one combustion chamber within the internal combustion engine 10 during the portion of the compression cycle within the minimum of one combustion chamber, but not including the beginning portion of the compression cycle within the minimum of one combustion chamber, there is attenuated a knock within the internal combustion engine 10 since the cooled compressed secondary injection air flow 19 charge absorbs heat from the primary intake air flow 12 which is fully compressed during the compression within the compression cycle within the minimum of one combustion chamber. For similar and/or related reasons, the cooled compressed secondary injection air flow 19 charge also enhances performance and enhances economy of the internal combustion engine 10.

Figure 2:
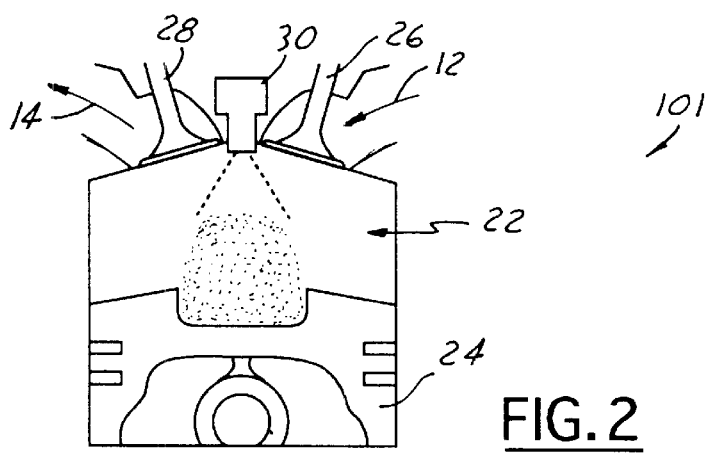
FIG. 2 shows a schematic diagram of an internal combustion engine that may be employed within the internal combustion engine system in accord with the present invention.

Referring now to FIG. 2, there is shown a schematic diagram illustrating in greater detail an internal combustion engine 101 which may be employed as the internal combustion engine 10 within the internal combustion engine system whose schematic diagram is illustrated in FIG. 1.

As is shown in FIG. 2, the internal combustion engine 101 comprises a combustion chamber 22 whose volume is variably defined by a reciprocating action of a piston 24 within the combustion chamber 22. The internal combustion engine 101 also comprises an intake valve 26 that is cyclically operated to permit entry of the primary intake air flow 12 into the combustion chamber 22, as well as an exhaust valve 28 that is cyclically operated to permit exhaust of the exhaust gas flow 14 from the combustion chamber 22. Finally, there is shown within the schematic diagram of FIG. 2 an injector 30 that is employed for injecting the cooled compressed secondary injection air flow 19 charge into the combustion chamber 22. Within the preferred embodiment of the present invention, the cooled compressed secondary injection air flow 19 charge will typically and preferably may be co-injected with a quantity of fuel, such as to promote optimal air/fuel mixing within the combustion chamber 22.

As is understood by a person skilled in the art, and for purposes of clarity, there is not illustrated within the schematic diagram of FIG. 2 a primary fuel source that supplies the combustion chamber 22 with a primary fuel charge. As is understood by a person skilled in the art, the primary fuel source may be selected from the group including but not limited to a carburetor or a fuel injector whose fuel output is supplied upstream within the primary intake air flow 12, and a fuel injector whose injected fuel output is injected directed into the combustion chamber 22. When employing such direct fuel injection, the present invention assists in attenuating a light load pumping loss within an internal combustion engine, such as the internal combustion engine 101.

Similarly, and also for purposes of clarity, there is also not illustrated within the schematic diagram of FIG. 2 a spark plug for spark igniting a compressed air/fuel mixture within the combustion chamber 22, since, as noted above, the present invention may be employed with spark ignition internal combustion engines as well as compression ignition internal combustion engines. With respect to a compression ignition internal combustion engine, and particularly with respect to a gasoline fueled compression ignition internal combustion engine, and similarly analogously with attenuation of knock within a spark ignition internal combustion engine, the present invention provides for attenuating early ignition and fast detonation within compression ignition internal combustion engines.

Figure 3:
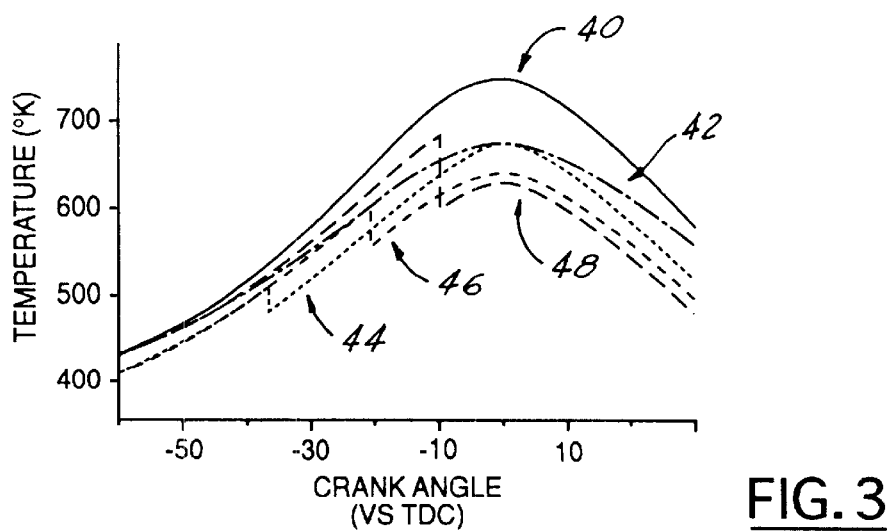
FIG. 3 shows a plot of Temperature versus Crank Angle with respect to a compressed gas within a combustion chamber during motoring for a series of internal combustion engines that includes a sub-series of internal combustion engines in accord with the present invention.

Referring now to FIG. 3, there is shown a series of prophetic plots of Temperature versus Crank Angle for gases compressed during motoring (i.e., without ignition) within: (1) a combustion cylinder within a conventional internal combustion engine in absence of the present invention; and (2) a combustion cylinder within an internal combustion engine in accord with the present invention. The data as reported within the series of prophetic plots of FIG. 3 assume a background internal combustion engine temperature of about 300 degrees centigrade and a cooled compressed secondary injection air mass of about one-third a total air mass within the combustion cylinder within the internal combustion engine. The total air mass within the combustion cylinder within the internal combustion engine is equal for all examples as illustrated within the series of plots of FIG. 3. To achieve the equal total air mass within the combustion cylinder, intake valve closing is prophetically modified accordingly within an internal combustion engine within which is injected a cooled compressed secondary injection air flow in accord with the present invention.

Within the prophetic plots of FIG. 3, the curve that corresponds with reference numeral 40 is a baseline curve for a conventional internal combustion engine absent the present invention, and operating at a compression ratio of 15. Within the prophetic plots of FIG. 3, the curve that corresponds with reference numeral 42 is a baseline curve for a conventional internal combustion engine absent the present invention, and operating at a compression ratio of 10. Finally, within the prophetic plots of FIG. 3, the curves that correspond with reference numerals 44, 46 and 48 correspond with internal combustion engines in accord with the present invention, having cooled compressed secondary injection air flow pressures respectively, of 7, 14 and 21 bar, and operating at a compression ratio of 15. As is illustrated within the prophetic plots of FIG. 3, an internal combustion engine fabricated and operated in accord with the present invention clearly shows a reduction of combustion chamber compressed gas temperature, in comparison with an otherwise conventional engine absent cooled compressed secondary injection air flow air injection in accord with the present invention.

As a related consideration in conjunction with the present invention, and as is also understood by a person skilled in the art, the present invention may also be employed with a variable valve timed internal combustion engine as is described in further detail within Dai et al., as cited within the Description of the Related Art. Under such circumstances, the present invention provides for optimized torque output, which is otherwise generally compromised when employing variable valve timing within an internal combustion engine.

As is finally understood by a person skilled in the art, the preferred embodiment of the present invention is illustrative of the present invention rather than limiting of the present invention. Revisions and modifications may be made to apparatus through which is provided the preferred embodiment of the present invention while still providing the present invention, further in accord with the accompanying claims.

What is claimed is:

1. An internal combustion engine system comprising:
    an internal combustion engine having a minimum of one combustion chamber;
    a gas compressor absent a compressed gas tank associated therewith, the gas compressor being driven by a power output of the internal combustion engine; and
    a control means programmed for providing a compressed gas charge from the gas compressor to the minimum of one combustion chamber during a portion of a compression cycle within the minimum of one combustion chamber, but not including a beginning portion of the compression cycle within the minimum of one combustion chamber.

2. The internal combustion engine system of claim 1 wherein the internal combustion engine is employed within an application selected from the group consisting of a transportation vehicle application, a mobile application other than a transportation vehicle application and a stationery application.

3. The internal combustion engine system of claim 1 wherein the internal combustion engine is selected from the group consisting of two cycle engines, four cycle engines, spark ignition engines, compression ignition engines, reciprocating piston engines and rotary piston engines.

4. The internal combustion engine system of claim 1 wherein the power output of the internal combustion engine is selected from the group consisting of a thermal power output, a mechanical power output and an electrical power output.

5. The internal combustion engine system of claim 1 wherein the control means is selected from the group consisting of electronic control means, electrical control means, mechanical control means and electromechanical control means.

6. The internal combustion engine system of claim 1 wherein the internal combustion engine employs variable valve timing.

7. A transportation vehicle having assembled therein an internal combustion engine system comprising:
    a transportation vehicle, the transportation vehicle having assembled therein an internal combustion engine system comprising:
        an internal combustion engine having a minimum of one combustion chamber;
        a gas compressor absent a compressed gas tank associated therewith, the gas compressor being driven by a power output of the internal combustion engine; and
        a control means programmed for providing a compressed gas charge from the gas compressor to the minimum of one combustion chamber during a portion of a compression cycle within the minimum of one combustion chamber, but not including a beginning portion of the compression cycle within the minimum of one combustion chamber.

8. The transportation vehicle of claim 7 wherein the transportation vehicle is selected from the group consisting of a passenger transportation vehicle, a sport utility transportation vehicle, a light utility transportation vehicle and a heavy utility transportation vehicle.

9. The transportation vehicle of claim 7 wherein the internal combustion engine is selected from the group consisting of two cycle engines, four cycle engines, spark ignition engines, compression ignition engines, reciprocating piston engines and rotary piston engines.

10. The transportation vehicle of claim 7 wherein the power output of the internal combustion engine is selected from the group consisting of a thermal power output, a mechanical power output and an electrical power output.

11. The transportation vehicle of claim 7 wherein the control means is selected from the group consisting of electronic control means, electrical control means, mechanical control means and electromechanical control means.

12. The transportation vehicle of claim 7 wherein the internal combustion engine employs variable valve timing.

13. A method for operating an internal combustion engine system comprising:
    providing an internal combustion engine system comprising:
        an internal combustion engine having a minimum of one combustion chamber;
        a gas compressor absent a compressed gas tank associated therewith, the gas compressor being driven by a power output of the internal combustion engine; and
        a control means programmed for providing a compressed gas charge from the gas compressor to the minimum of one combustion chamber during a portion of a compression cycle within the minimum of one combustion chamber, but not including a beginning portion of the compression cycle within the minimum of one combustion chamber; and
    operating the internal combustion engine while providing the compressed gas charge from the gas compressor to the minimum of one combustion chamber during the portion of the compression cycle within the minimum of one combustion chamber, but not including the beginning portion of the compression cycle within the minimum of one combustion chamber.

14. The method of claim 13 wherein the internal combustion engine is employed within an application selected from the group consisting of a transportation vehicle application, a mobile application other than a transportation vehicle application and a stationery application.

15. The method of claim 13 wherein the internal combustion engine is selected from the group consisting of two cycle engines, four cycle engines, spark ignition engines, compression ignition engines, reciprocating piston engines and rotary piston engines.

16. The method of claim 13 wherein the power output of the internal combustion engine is selected from the group consisting of a thermal power output, a mechanical power output and an electrical power output.

17. The method of claim 13 wherein the control means is selected from the group consisting of electronic control means, electrical control means, mechanical control means and electromechanical control means.

18. The method of claim 13 wherein the internal combustion engine employs variable valve timing.

19. The internal combustion engine system of claim 1 further comprising a heat exchanger which cools the compressed gas charge to a temperature about 20 to about 25 degrees centigrade above a temperature of an ambient environment which surrounds the internal combustion engine.

20. The transportation vehicle of claim 7 further comprising a heat exchanger which cools the compressed gas charge to a temperature about 20 to about 25 degrees centigrade above a temperature of an ambient environment which surrounds the internal combustion engine.

21. The method of claim 13 further comprising a heat exchanger which cools the compressed gas charge to a temperature about 20 to about 25 degrees centigrade above a temperature of an ambient environment which surrounds the internal combustion engine.

* * * * *